United States Patent

Wiggins

[15] 3,648,243

[45] Mar. 7, 1972

[54] RECORDING SYSTEM FOR JOB-ACCOUNTING INFORMATION

[72] Inventor: Walter J. Wiggins, 308 North Tioga St., Ithaca, N.Y. 14850

[22] Filed: Feb. 6, 1970

[21] Appl. No.: 9,387

[52] U.S. Cl. ........................340/152, 235/92 PD, 235/151.1, 340/147

[51] Int. Cl. ........................................................H04q 9/00

[58] Field of Search ........................340/152, 147, 182, 310; 179/2 DP; 235/92, 151.1, 92 AC

[56] References Cited

UNITED STATES PATENTS

| | | | |
|---|---|---|---|
| 3,351,912 | 11/1967 | Collom et al. | 235/92 |
| 3,381,276 | 4/1968 | James | 179/2 DP |
| 3,221,150 | 11/1965 | Goodwin | 235/92 |
| 3,240,427 | 3/1966 | Holman | 179/2 DP |

*Primary Examiner*—John W. Caldwell
*Assistant Examiner*—Howard S. Cohen
*Attorney*—Cushman, Darby & Cushman

[57] ABSTRACT

An apparatus for centrally recording digital job-accounting information from a plurality of remote stations with central station control means for allowing access from only one remote station to the central station at a time, means to record manually inserted check-in, checkout and job identification information and automatic means to automatically record all other desired job-accounting information. Indicator and warning means are also provided to assist in normal operation of the apparatus and/or warn an operator of possible missing manually inserted information.

15 Claims, 4 Drawing Figures

Figures 1, 2, 3:
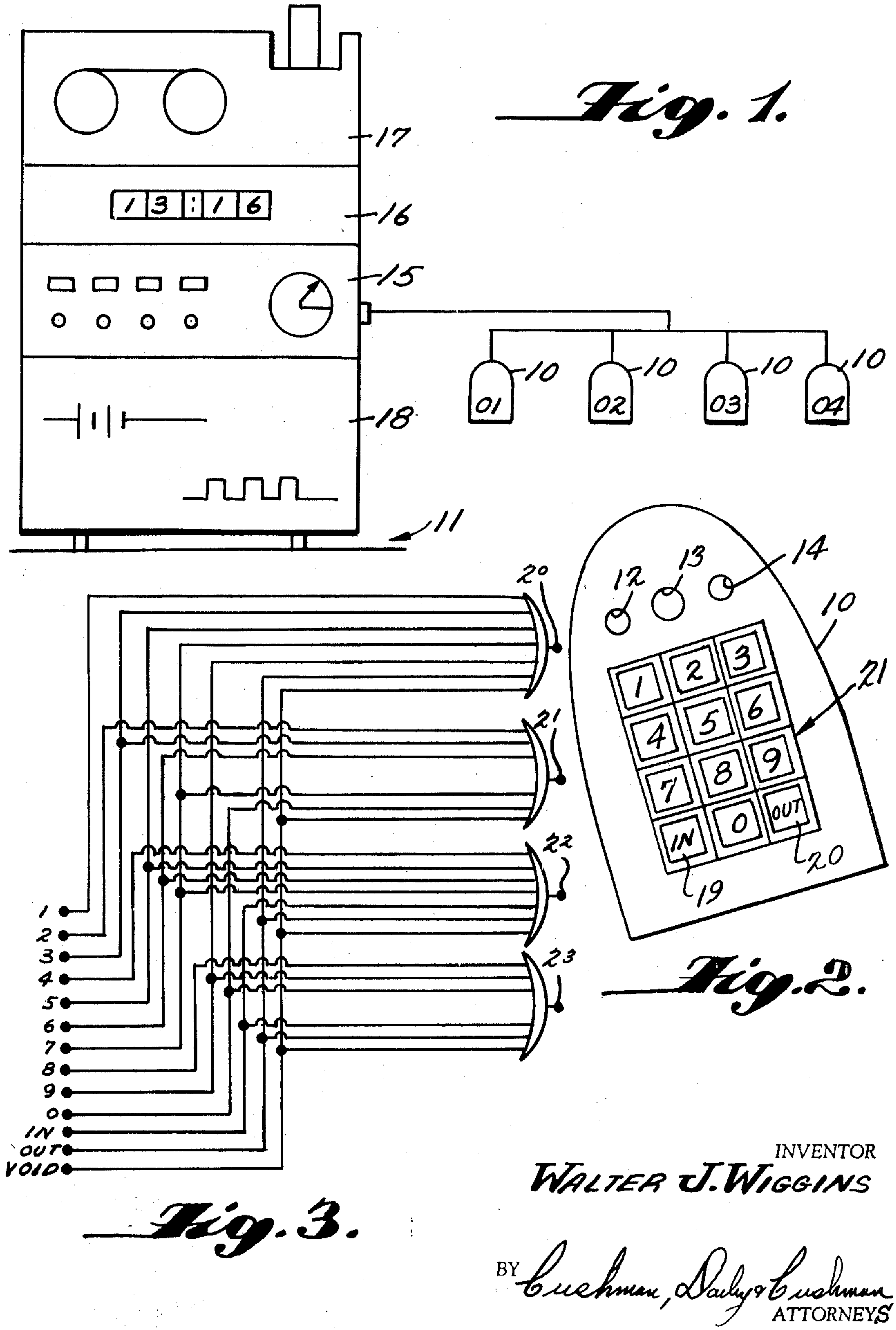

INVENTOR
WALTER J. WIGGINS

BY Cushman, Darby & Cushman
ATTORNEYS

INVENTOR
WALTER J. WIGGINS
BY Cushman, Darby & Cushman
ATTORNEYS

RECORDING SYSTEM FOR JOB-ACCOUNTING INFORMATION

The collection and reduction of job-accounting information has been a longstanding problem in commerce and industry. In many business environments where it is necessary to maintain a record for each of several different jobs of time expended by one or more employees or groups of employees. For instance, in a large automobile garage, any given mechanic may work on many different jobs (for different customers) during each day. Further, the time actually expended on any one particular job may be an accumulation of time increments interspersed with interruptions for higher priority jobs or other duties not related to the interrupted job.

A lawyer's office is another example of an environment where it is often difficult and time consuming to accurately keep necessary expended time records for each member of the firm and for the many different clients of the firm. Merely keeping time records for each firm member and each client is burdensome, but the task is even further complicated when unexpected telephone calls, etc., temporarily interrupt a job that is already in progress.

Prior attempts to solve the problem of minimizing the effort and time involved in collecting and reducing job-accounting information have been unsatisfactory in that they have resulted in complicated and/or expensive equipment that is often very cumbersome to operate or uneconomical for any but a very large concern. Because of these inadequacies, most current business environments are still using a primarily manual operation to collect and reduce such job-accounting information.

Using this invention, such laborious manual procedures are no longer necessary and the inexpensive apparatus disclosed below will be within the reach of many smaller business concerns. As more completely described below, the job track device of this invention allows an employee or other staff member to remotely record start and stop times in association with job identification information comprising a customer's or client's account number and a task code indicating the nature of the work. Provisions have also been made to allow suspension of time recordation during temporary interruptions of any task.

The recorded record itself is either a standard magnetic or punched paper tape that could be processed by any available Computer Service Bureau, as well as a typed printout that could be reduced by hand. With automatic data processing, these results can be readily presented in a number of different formats at a very reasonable cost. This could even include comparison against projected figures for immediate control of expended effort.

Thus, it is an object of this invention to provide a simple and inexpensive apparatus for centrally recording digital job-accounting information from a plurality of remote stations. After such information has been permanently recorded in machine readable digital form, an accumulation of such recorded information may be machine processed by a computer under appropriate programmed control to sort and/or reduce the recorded data to any desired format such as tabulations and compilations by job, employee or any other desired sequence. Of course, the data could be fed directly to computing apparatus rather than being recorded if that is desired.

It is a further object of this invention to provide a simple and inexpensive central control means which will allow only one remote station to transmit information to the central recording apparatus at a time thereby preventing interference between different remote stations desiring to record data at the same time.

Yet another object of this invention is to provide a job track device which is simple to operate in that each employee has a keyboard with which to manually insert job identification information and an indication of whether the employee is starting (check-in) or stopping (checkout) in association with a particular job identification code, all other necessary job-accounting information being automatically generated by the job track device.

Another object of this invention is to provide a job track device which is both simple to operate and reliable in that each remote station provides indicating means to inform an employee when job-accounting information has been successfully recorded or when it may be manually entered on a keyboard and a warning indication when the provided information is incomplete or when the central control means will not allow that particular remote station to access the central recording equipment.

It is also an object of this invention to provide a job track device wherein any number of characters may be manually inserted during a predetermined time interval which, although fixed at any given time for any given system, may be conveniently made longer or shorter by alterations at the central control means.

Figure 4:
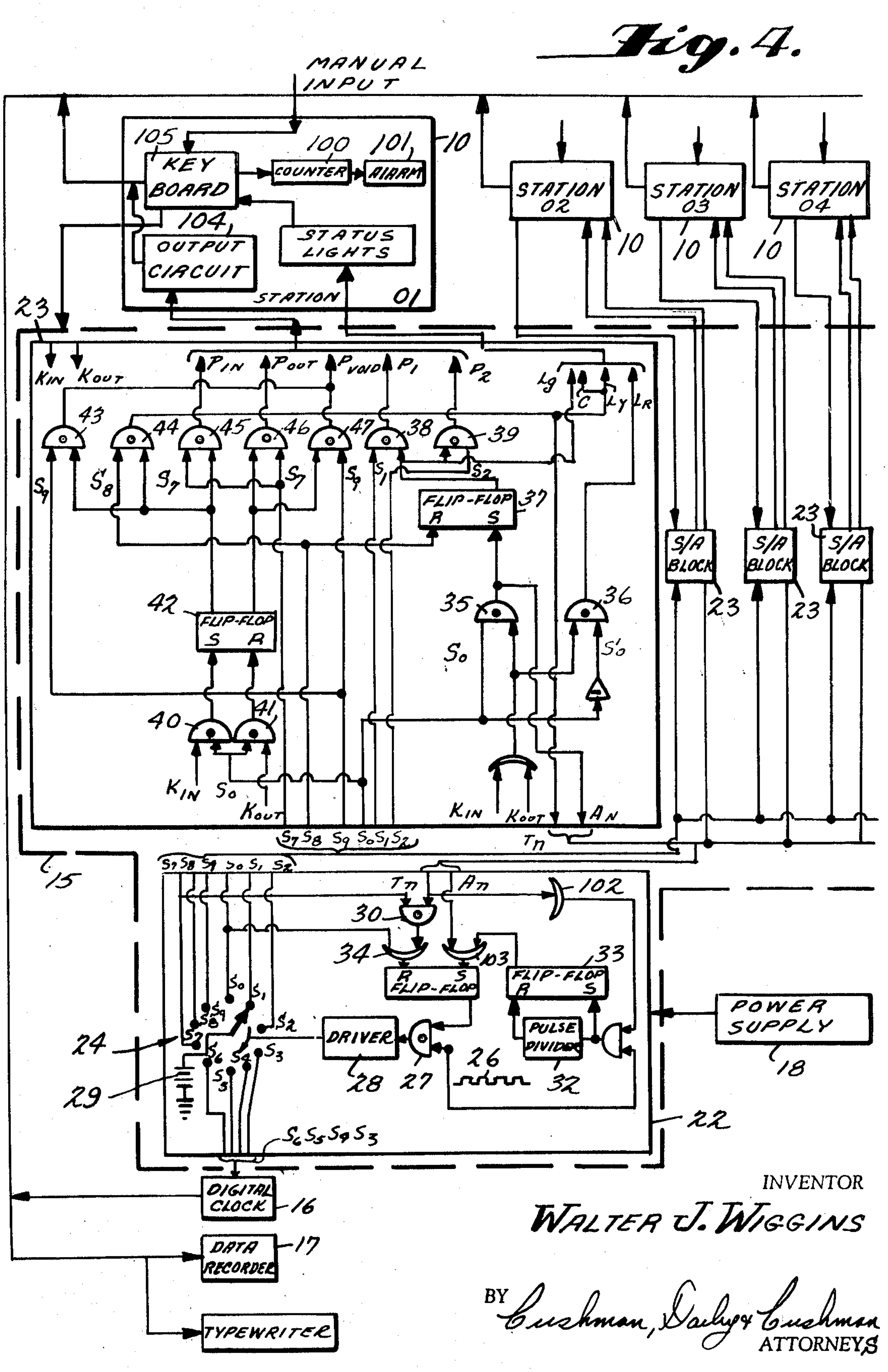

A more complete and detailed understanding of this invention may be obtained by studying the following detailed description in combination with the accompanying drawings of which:

FIG. 1 provides a pictorial view of the central control and recording means and the plurality of remote stations incorporated in this invention, FIG. 2 is a pictorial view of a keyboard for use at a remote station, FIG. 3 is a schematic diagram of an output circuit which may be used at each of the plurality of remote stations incorporated in this invention, and FIG. 4 is a combined schematic and block diagram of one embodiment of this invention.

Referring to FIG. 1, the job track device of this invention incorporates a number of remote units or stations 10 for transmitting manually inserted individual operator or employee information and a central station generally depicted as element 11 in FIG. 1 to collect and record this information and automatically add other desired data. One remote station is provided for each employee for which job-accounting information is desired. Such a remote station may comprise a desk top or wall-mounted pushbutton keyboard as shown in FIG. 2. The keyboard shown in FIG. 2 has three status lamps 12, 13 and 14 and a keyboard used for manually gaining access to the central station and for transmitting information thereto.

The central station shown in FIG. 1 includes a controller 15, a conventional digital clock 16 such as the Digitec Model 661, digital data recorder 17, and an appropriate power supply 18. The digital data recorder 17 may be of any conventional design which produces permanently recorded machine readable magnetic tape or paper tape such as the Ohrtronics, Inc. Series 110 paper tape punch. Of course, besides recording the information in machine readable form on paper or magnetic tape, appropriate provisions may also be made for making a typewritten record for subsequent manual data reduction. A digital typewriter printer such as the Digitec 621/611 digital printer can be used for this function if it is desired.

From the operator or employee's point of view, the operation of a remote station is extremely simple. When he is ready to begin work on any job he merely checks in by pressing the "IN" button 19 on keyboard 10 plus manually keying in job identification data as explained below, and to stop work on any job he only needs to press the "OUT" button 20.

Depression of the "IN" button 19 causes a coded check-in instruction word to pass to digital data recorder 17 which check-in word contains a unique number assigned to the particular station associated with the depressed button and current time data from digital clock 16 together with appropriate identification to indicate that the particular operator is checking "IN" rather than "OUT."

The numeric elements 21 on keyboard 10 are used to manually enter an account number word on data recorder 17 for recording after every check-in word. The account number word contains a job identification code for the job and/or task which the operator or employee is preparing to begin. For quick and ready reference, there should be a convenient listing available of previously agreed upon numeric codes which correspond to particular jobs, projects, tasks and/or clients. In any given job track device, the total number of such job identification digits must be fixed; however, since this predetermined fixed number may be selected to be large with respect to the number of different tasks or jobs actually anticipated, it is possible to include a great deal of flexibility in a particular coding scheme employed for job identification purposes. For instance, if a law office has a maximum number of 1,000 clients, then a three-digit client identification number may be assigned to each individual client, and a fourth task identification digit may be utilized to indicate the particular type of work being done for that particular client. Obviously, other more complex coding arrangements could be devised having any desired degree of flexibility and complexity.

Depression of the "OUT" button 20 also causes a coded checkout instruction word to pass to the data recorder 17. This checkout word contains a unique station or employee number identifying the particular employee checking out and current time data from digital clock 16 together with appropriate identification, in this case to indicate that the particular operator is checking "OUT" (checkout) rather than "IN" (check-in).

The job track device of this invention allows any operator to readily enter interruptions and resumptions of activity on a particular project without the necessity of punching in the associated job identification code each time activity is resumed. The only time it is necessary for an operator to enter such job identification is at the beginning of the day or when activity is switched from one project to another or from one client to another client, etc. At any subsequent time, any operator can check out by merely pressing the "OUT" button 20 as previously described. To check back in then, the operator merely presses the "IN" button 19 and instead of punching in job identification, he merely punches the numeric "0" button which is conveniently located between the "IN" button 19 and "OUT" button 20 thus helping the operator to remember the proper procedure. During data reduction, the computer program or software is designed to interpret such a single numeric "0" in the account number word as meaning the same as the immediately preceding account number code for that particular employee or remote station. There is no limit to the number of such interruptions which may be recorded, but it should be clear that any time associated with such interruptions is lost and is not recorded for any other job unless the interrupted time is appropriately recorded by checking in with the proper job identification for the interrupting job or task and then checking back in again and reentering the job identification for the job that was interrupted.

The status lamps 12, 13 and 14 facilitate the above operations. When the "IN" button 19 or the "OUT" button 20 is depressed, a green light indicator 12 comes on to indicate that the check-in or checkout instruction word has gone through to the recorder 17. Otherwise, red light 14 will come on when either button is pressed to indicate that the central recorder is busy in that another remote station is already in the process of transferring information to it. Therefore, the particular remote station belatedly requesting access to the central data recorder 17 has been refused access as indicated by the lighting of red light 14.

After a successful check-in (green light 12 momentarily lights), yellow light 13 comes on to indicate a predetermined access time interval for sending through a job identification code to recorder 17. At all other times, yellow light 12 is off and the numeric section 21 of keyboard 10 is inhibited thereby preventing an employee from entering a job identifiation code before punching "IN" button 19.

Since an operator may occasionally forget to punch the "OUT" button 20 before checking in with a new job, a checkout on a current project will automatically be assigned to the current job for that employee the next time the operator checks in with another project. Such an automatic checkout may be achieved through program or software features during data reduction without requiring any additional hardware. All the intervening time between two such successive check-in's will be charged to the just previous project. When an employee is engaged in a series of projects back-to-back, he can utilize these features advantageously to dispense with pressing the "OUT" button 20 altogether. That is, the employee need only check-in with each successive job identification code and then checkout only at the end of the day. Additional program or software features may cause an entry to be disregarded should the operator depress the "OUT" button 20 without having checked in beforehand.

The predetermined time interval or access time for the previously mentioned manual entry of a job identification code may be adjusted as desired at the central station. If the operator does not completely enter the job identification code during this predetermined time interval, a momentary warning alarm will sound thus signaling the operator to try again. The resulting incomplete record recorded by data recorder 17 can automatically be discarded by the program or software during the data processing phase. A similar sequence will apply in the event an operator forgets altogether to enter any job identification code after checking in. Of course, it also follows that the resumption of a project after interruption, which is designated by the single digit "0," as a job identification code will appear as an incomplete job identification code to the job track device. Accordingly, the alarm will sound as usual but the record may now be read by the program or software as a resumption of effort and will not be discarded during the data processing stages of data reduction.

It should be obvious that memory units could be built into the system to detect actuation of the "IN" or "OUT" buttons 19 and 20, storing this information when the system is in use, and then transmitting it when clear. The operator himself then would not have to "wait in line" to get through to the central station. Since the cycle times involved, even for check-in, will be only a fraction of a minute, such probable delays to an operator should be quite short and accordingly, such memory units are not believed to be necessary and should not be included unless the extra expense is acceptable to the user for the benefit gained.

Since a five-channel binary coded decimal (BCD) format is the conventional format for most available data recorders, a conventional BCD coding scheme as noted below has been incorporated in the embodiment disclosed herein. Since one of the five channels is normally used for parity checking, only the four other channels are shown below.

| Character | BCD Code |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 0 | 1010 |
| "IN" | 1100 |
| "OUT" | 1101 |
| "VOID" | 1111 |

Although the above-described BCD code is utilized in the preferred embodiment of the invention, it should be obvious that other digital coding schemes could be used within the meaning of this invention. An interconnection of wires and/or gates is shown in FIG. 3 to accomplish this BCD coding scheme taking single channel inputs on terminals 1, 2,...VOID and producing a four-channel output on terminals 2°, 2', $2^2$ and $2^3$. The fifth parity channel is not shown, but it may be generated and added with conventional circuitry according to an even, odd or any other type of parity checking scheme.

The embodiment depicted in FIG. 4 utilizes a seven-digit check-in or checkout instruction word including a two-digit station identification code, a four-digit current time data code and a one-digit "IN" or "OUT" code character. The two digits allocated for station identification provide for a system capacity of 100 employees or remote units; however, obviously this system could be readily modified to accommodate additional employees or remote units by merely adding to the number of digits allocated for this purpose. The four-digit time code represents the use of a 24-hour clock with the current time being given in hours, tenths and hundredths of hours. If desired, a calendar clock may be employed to include the date as well as the time with appropriate provisions for three extra digits in the time code thus making a 10-digit check-in or checkout instruction word.

The account number word or job identification code for the device of FIG. 4 is assumed to contain the predetermined number of four digits as set up by the coding scheme previously given by way of an example. When recorded by digital data recorder 17, a check-in instruction word plus account number word is combined and recorded as a unit which is separated from other such units and/or checkout instruction words by a single digit "VOID" automatically entered by the system thereby permitting a computer under a proper program control to recognize these entries during data reduction as separate fields or records and to process the data accordingly.

Generally, the elements of the invention must cooperate during check-in (1) to establish access from a particular remote station to the central station by flashing red light 14 and inhibiting further operation if the central station is already in use or by lighting green light 12 if the central station is available; (2) to record the check-in instruction word by transmitting the unique station number of that particular remote station, the current time from digital clock 16 and an "IN" digit to data recorder 17; (3) to add on a manually entered job identification code or account number word entered by the operator during an access time aperture indicated by yellow light 13 and sounding a warning alarm if such job identification information is not attempted or is incomplete at the end of such an access time aperture; and (4) to transmit the code character "VOID" to data recorder 17 and reset controller 15 thus permitting subsequent access to a different remote station.

During checkout the elements of this system must cooperate (1) to establish access from a particular remote station to the central station by flashing red light 14 and inhibiting further operation if central station 11 is already in use or by lighting green light 12 and establishing access with controller 15 if the central station is available; (2) to record a checkout instruction word including the unique station or employee identification corresponding to the particular remote station accessed, the current time data from digital clock 16 and an "OUT" digit; and (3) to transmit a "VOID" code character to data recorder 17 and reset controller 15 for subsequent access to another remote station.

Each remote station 10 is equipped with a standard keyboard such as the new NW series type made by the Microswitch Division of Honeywell, Inc. Status lamps 12, 13 and 14, an alarm and associated wiring are added. The pushbutton keyboard switches provide electrical switch closures when pressed and are wired internally for the BCD code previously described. This five-channel BCD output is transmitted directly to data recorder 17. In addition, a small electronic counter 100 is incorporated with each station to count the number of keyboard entries while the keyboard is activate; and if less than the predetermined number of digits in the job identification code, a signal is sent to an alarm 101 included with each remote station.

The central station 11 includes a standard digital data recorder 17, digital clock 16 and power supply 18 as well as a controller 15 which is shown in more detail within the dotted lines in FIG. 3. As shown, controller 15 includes a central control unit 22 and a plurality of select/actuate (S/A) blocks 23, one such S/A block being provided for each individual remote station.

Actually, these S/A blocks can be located either separately with each respective remote station or together with the central control unit 22. To minimize the number of wires between each remote station 10 and the central station 11, the S/A blocks have been grouped in FIG. 3 with the central control unit 22 thus constituting a part of central station 11.

At the heart of central control unit 22 is an electromechanical sequencer 24 which provides successive rotating contact to 10 different contacts generally designated as $S_1, S_2, \ldots S_9, S_0$. Of course, sequencer 24 could be entirely electronic instead of electromechanical if desired. In a standby mode, sequencer 24 is stationary at contact $S_0$. When an input signal $A_N$ is received from some remote station N, flip-flop 25 is set and a square wave 26 from power supply 18 is admitted through AND-gate 27 to driver 28 thus causing sequencer 24 to begin successive rotation through switch positions $S_1, S_2, \ldots S_9, S_0$ respectively corresponding to cycle states $S_1, S_2, \ldots S_9, S_0$. Subsequently described operations then cause the sequencer 24 to pause momentarily in each state thereby causing an output voltage 29 on output terminals corresponding to the respective switch states.

However, when sequencer 24 reaches state $S_8$, further rotation will be inhibited during a predetermined access time interval or aperture during which the appropriate predetermined number of job identification code digits are transmitted to data recorder 17. This temporary inhibition and the previously mentioned standby mode are achieved as described below. When the sequencer 24 reaches state $S_8$, an input $T_N$ from the accessed station N is transmitted simultaneously to AND-gate 30 and AND-gate 31. Since the only other input of AND-gate 30 is tied to sequencer output $S_8$, AND-gate 30 now produces an output which through OR-gate 34 will reset flip-flop 25 thereby cutting off the output of AND-gate 27 and consequently inhibiting driver 28. Simultaneously, AND-gate 31 now receives an input $T_N$ through OR-gate 102, thus passing square wave 26 to pulse divider 32 which, after a predetermined access time interval or aperture, emerges as a delayed signal which resets flip-flop 33 thus causing an output which, through OR-gate 103, sets flip-flop 25 again thus returning the system to its normal method of operation. Of course, whenever sequencer 24 reaches states $S_0$, DC voltage 29 will be coupled to OR 34 thus resetting flip-flop 25, removing the output from AND-gate 27 and inhibiting driver 28 until a subsequent signal $A_N$ is received from the same or another remote station thereby setting flip-flop 25 and again actuating driver 28.

With the operation of the central control unit 22 now explained, the S/A block 23, one of which is provided for each of the several remote stations, will be discussed. Actuation of the "IN" button 19 or the "OUT" button 20 on keyboard 10 causes a voltage to appear at $K_{IN}$ and $K_{OUT}$ respectively as detailed in the leftmost S/A block 23 in FIG. 4. This $K_{IN}$ or $K_{OUT}$ voltage is detected by AND-gates 35 and 36. If the central station is not currently in use, sequencer 24 will be positioned at $S_0$ and the output voltage 29 present at $S_0$ will be combined with either the $K_{IN}$ or $K_{OUT}$ voltage to provide the signal $A_N$ at the output of AND-gate 35 which is transmitted back to the central station to start the operating cycle of the sequencer as previously mentioned by setting flip-flop 25. In addition, flip-flop 37 in the S/A block is set and produces an output voltage $L_g$ used to illuminate the green light 12. This output $L_g$ is also combined with sequencer outputs $S_1$ and $S_2$ at AND-gates 38 and 39 respectively as the sequencer steps through states $S_1$ and $S_2$ thus providing voltages $P_1$ and $P_2$ which are connected to appropriate terminals in the output circuit 104 as shown in FIG. 3, thus recording the two unique digits identifying the employee or remote station number N (in this case 01). On the other hand, if the system is currently in use, the sequencer is in some state other than $S_0$ and $S_0'$ combines with $K_{IN}$ or $K_{OUT}$ to cause an output from AND-gate 36, $L_r$ which is used to illuminate red light 14.

At the same time, AND-gates 40 and 41 combine the voltage $K_{IN}$ or $K_{OUT}$ with sequencer output $S_0$ (if in fact the sequencer is in state $S_0$) thus setting or resetting respectively flip-flop 42 depending upon whether the operator has manually punched the "IN" button 19 or the "OUT" button 20 respectively at this particular remote station.

Assuming the operator has manually depressed the "IN" button 19, AND-gate 40 sets flip-flop 42 and provides an output to AND-gates 43, 44 and 45. The production of outputs $P_1$ and $P_2$ corresponding to sequencer states $S_1$ and $S_2$ has already been described. Sequencer 24 outputs $S_3$, $S_4$, $S_5$ and $S_6$ are transmitted directly to digital clock 16 causing the four current time data digits to be recorded on data recorder 17. When sequencer 24 arrives at $S_7$, the set output voltage from flip-flop 42 and the $S_7$ voltage are combined in AND-gate 45 thus producing output voltage $P_{IN}$ which is appropriately connected to the output circuit 104 shown in FIG. 4 to cause data recorder 17 to record the digit "1N." Subsequently, at state $S_8$, AND-gate 44 produces output C which is used to energize keyboard 105, output $T_N$ which is transmitted back to the central station to initiate the previously described predetermined access time interval or aperture and output $L_y$ to illuminate yellow light 13 during this predetermined access time interval or aperture. At the end of this access time interval, sequencer 24 is again actuated, as previously described, and advances to state $S_9$, which output $S_9$ is then combined by AND-gate 43 with the output from flip-flop 42 to produce output $P_{VOID}$ which is appropriately connected to the output circuit 104 shown in FIG. 3 thus causing the character VOID to be recorded on data recorder 17.

Now assuming that the "OUT" button 20 has been depressed by the operator, it will be appreciated that the operation of the central control unit 22 and S/A block 23 is exactly the same as previously described through sequencer states $S_1$–$S_6$; however, when sequencer 24 reaches state $S_7$, keyboard output $K_{OUT}$ is combined by AND-gate 41 to reset flip-flop 42 and provide an output which is used as input to AND-gates 46 and 47. Thus at state $S_7$, AND-gate 46 provides an output $P_{OUT}$ which is appropriately connected to the output circuit 104 of FIG. 3 thus permitting the BCD character "OUT" to be recorded on data recorder 17. It will be noted that during this checkout procedure, sequencer state $S_8$ is not utilized and accordingly, nothing is recorded on data recorder 17 during state $S_8$ and, since output $P_N$ is not transmitted back to the central station, driver 28 is not inhibited and sequencer 24 proceeds directly to state $S_9$. This provides an output $S_9$ to AND-gate 47 which in turn provides an output $P_{VOID}$ which is appropriately connected as before to output circuit 104 shown in FIG. 3 thus causing the recording of the character "VOID" on data recorder 17.

A simple and inexpensive job track device or apparatus has now been described which accomplishes all the desired recording functions. The overall system may be further enhanced by increasing the complexity of the software or program which controls the computer during data reduction. Thus the previously described automatic checkout feature when two successive check-ins are attempted, the recognition of a "0" job identification code as being equivalent to the just-previous job identification code for that particular remote station and other more complex features may be included under program control during the data reduction or processing phase rather than during the recording phase to keep the necessary equipment as shown in FIG. 4 both simple and inexpensive.

The output circuit 104 is shown in FIG. 3 as an interconnection of wires and OR gates arranged to perform the BCD encoding previously described for at least the remote station or employee identification code, "IN," "OUT" and "VOID" code character symbols. Appropriate voltages from previous circuits are fed as inputs to terminal 1, 2...VOID and the outputs from terminals $2^0$ to $2^3$ are transmitted to data recorder 17. For instance, the voltages on $P_1$ and $P_2$ from the S/A block are respectively connected to the two of terminals 1, 2...0, which correspond to the particular number or station identification code assigned to that station. If necessary, additional OR gates which are not shown may be included to afford electrical isolation between the S/A blocks.

Although only one embodiment of this invention has been particularly described above, it will be appreciated that one skilled in the art could make many modifications to the basic embodiment disclosed without departing from the scope of this invention. For instance, if more than than four job identification code characters are desired for an account number word, the access time interval controlled by pulse divider 32 may be lengthened and an appropriate change can be made to counters 100 at each remote station. If additional employee code digits, time data digits or other data is desired, then sequencer 24 may be appropriately expanded to include additional cycle states. Other modifications will be obvious to anyone skilled in the art in view of the foregoing specification.

I claim:

1. An apparatus for digitally recording job-accounting information which includes at least a clock-in and clock-out code, current clock time data, a remote station identification code and a job identification code and where such information is recorded at a central station from a plurality of remote stations, said apparatus comprising:
   - digital data recording means for permanently recording digital electrical signals,
   - digital clock means for providing digital electrical clock signals representing the current clock time to said digital data recording means,
   - a plurality of remote station means for transmitting coded digital electrical data signals representing at least a clock-in or clock-out code, a unique remote station identification code and a job identification code to said data-recording means, and
   - control means operatively connected to each of said remote station means and to said digital clock means including means for selectively enabling a single one of said remote station means, upon request therefrom, to individually transmit said electrical data signals in a predetermined sequence and means for enabling said digital clock means to transmit said clock signals for recordation in a commonly associated recorded data field by said digital data-recording means.

2. Apparatus as in claim 1 wherein each of said remote station means includes means for presetting a unique employee identification code as said unique remote station identification code for subsequent automatic transmission whenever that particular remote station has been appropriately enabled by said control means.

3. Apparatus as in claim 1 wherein each of said remote station means includes warning means for indicating a possible error whenever less than a predetermined number of job identification code digits have been transmitted to said data-recording means during an allocated time interval for such transmission.

4. Apparatus as in claim 1 wherein each of said remote station means includes:
   - access indication means for visually indicating whenever said remote station means has been allowed access by said control means and thereby enabled to transmit signals to said data-recording means,
   - transmit indication means for visually indicating an allocated time interval during which said job identification code may be encoded and transmitted to said data-recording means, and
   - busy indication means for visually indicating whenever said remote station means has been refused access to said data recorder by said control means.

5. Apparatus as in claim 1 including coding means for transmitting a unique record separation character code to said data-recording means whenever one complete record or field of job-accounting information has been recorded.

6. Apparatus as in claim 1 wherein each of said remote station means includes:

manually operated IN and OUT switch means for transmitting said clock-in code or said clock-out code respectively to represent the beginning or ending respectively of a job working period, and means for signaling said control means to request individual access from said remote station means to said data-recording means whenever said IN or said OUT switch means are manually actuated.

7. Apparatus as in claim 6 including:

a plurality of manually operated switch means for encoding the digits of said job identification code.

8. A central controller for use in an information collection system wherein coded digital data characters from a plurality of remote stations and digital clock characters from a central clock are centrally recorded on a common recorder, said central controller comprising:

a plurality of select/access circuit means, each respectively associated with one of said plurality of remote stations including means for requesting access to said common recorder, means for selectively transmitting said digital data characters to said common recorder only after successfully requesting and obtaining access thereto and means for refusing access if any other one of said select/access circuit means is already utilizing said common recorder, sequencer means connected to each of said select/access circuit means and to said central clock for sequentially and selectively causing transmission of said digital data characters and said digital clock characters to said digital recorder in a predetermined sequence said sequencer means including;

cycle means having at least one rest state and a series of cycle states, and transmit means for causing transmission of at least one of said digital data characters or one of said digital clock characters to said common recorder while said cycle means is in each of said cycle states, and drive means connected to said sequencer means for sequentially cycling said sequencer means from said rest state successively through each of said cycle states and back to said rest state, and delay means operatively connected for inhibiting further cycling of said drive means whenever said drive means is in at least a selected one of said cycle states thereby maintaining said sequencer means in said selected cycle state for an increased length of time during which period of time manually entered data is permitted to pass to said common recorder.

9. A remote station for use in an information collection system wherein coded digital data characters from a plurality of remote stations and digital clock characters from a central clock are centrally recorded at a central station on a common recorder, said remote station comprising:

manually operated IN and OUT switch means for transmitting unique IN and OUT code characters respectively to said common recorder, signaling means operatively connected to said IN and OUT switch means for signaling said central station and thereby requesting individual access from said remote station to said central station whenever either said IN or said OUT switch means is operated, manually operated switch means for manually encoding at least a portion of said coded digital data characters, access indication means for visually indicating whenever said remote station has been permitted individual access to said central station, transmit indication means for visually indicating an allocated time interval during which at least a portion of said digital data characters may be entered on said manually operated switch means, and busy indication means for visually indicating that access to said central station has been refused.

10. A remote station as in claim 9 including:

means for presetting at least a portion of said coded digital data characters, and means for automatically transmitting such preset characters to said central station.

11. A remote station as in claim 9 including warning means for indicating whenever less than a predetermined number of manually encoded digital data characters have been transmitted to said recorder during an allocated time interval for transmission of such characters.

12. A system for generating and centrally recording digital employee job-time accounting data wherein the required employee actuation thereof from respectively associated remote terminals is relatively simple and straightforward, said system comprising:

a plurality of remote terminals, each remote terminal including a manually operated keyboard for manual entry of digital job identification data, and a check-in key and a checkout key for manual actuation to generate check-in and checkout data representing the desire of an employee to begin and to terminate job related activities respectively, a plurality of coding circuits, each being respectively associated with one of said remote terminals for automatically generating predetermined employee identification data when energized, a plurality of select/access circuits, each being respectively associated with one of said remote terminals, a centrally located recording sequence control circuit connected to each of said select/access circuits for generating sequential control signals corresponding to a desired order of data recording, a centrally located digital clock connected to said control circuit for generating digital clock data representing the current clock time in response to predetermined control signals from said control circuit, and digital data recorder means effectively connected to said digital clock and to each of said remote terminals and coding circuits for recording said check-in data, said checkout data, said employee identification data, said job identification data and said digital clock data, said control circuit including a cyclically operated sequencer having a predetermined rest output representing an inactive ready condition and a series of predetermined sequential control output which begin to occur when the control circuit is activated by depression of either a check-in or a checkout key associated with one of said remote terminals, each of said control outputs representing a time period during which predetermined elements of said data are to be recorded, said control circuit including delay means for causing at least one of said control outputs to be delayed for a predetermined time period during which said manually entered job identification data is to be recorded, each of said select/access circuits including logic gating circuitry connected to receive said rest output and said control outputs from said control circuit and to operate therewith for activating its associated remote terminal only if said rest output exists when one of the check-in and checkout keys is actuated thereby effectively preventing access to said recorder means by more than one remote terminal at a time.

13. A system as in claim 12 wherein said logic gating circuitry in each select/access circuit comprises:

at least one bistable circuit having a first state corresponding to an inactive status where its associated remote terminal is not activated and a second state corresponding to an activated status where its associated remote terminal is activated to cause data recording therefrom, input logic means for said bistable circuit and connected to said control circuit and to its associated remote terminal, said input logic means responding to the existence of said rest state and actuation of one of the associated remote terminals check-in and checkout keys to place said bistable circuit in its second state, and a further effective electrical connection from said control circuit to said bistable circuit to cause its resetting to said first state upon the occurrence of a predetermined one of said sequential control signals.

14. A system as in claim 13 wherein at least some of the logic gating circuitry of each select/access circuit is connected to respond to the second state of said bistable circuit and to at least some of said sequential control signals for producing output signals to cause its associated remote terminal to send predetermined data to said recorder means.

15. A system as in claim 14 wherein each of said select/access circuits includes:

a further bistable circuit having a first state corresponding to a check-in status for its associated remote terminal and a second state corresponding to a checkout status for its associated remote terminal, further input logic means connected to cause said further bistable circuit to assume said first state in response to the existence of said rest state and actuation of the checkout key of its associated remote terminal and to assume said second state in response to the existence of said rest state and actuation of the checkout key of its associated remote terminal, and means connected to outputs of said further bistable circuit to cause predetermined check-in data and checkout data to pass to said recorder means in response to a predetermined one of said sequential control signals and to said first and second states respectively.

* * * * *